United States Patent
Lahtinen (10) Patent No.: US 7,302,480 B2
(45) Date of Patent: Nov. 27, 2007

(54) MONITORING THE FLOW OF A DATA STREAM

(75) Inventor: Jesse Lahtinen, Espoo (FI)

(73) Assignee: Stonesoft Corporation, Helsinki (FI)

( * ) Notice: Subject to any disclaimer, the term of this patent is extended or adjusted under 35 U.S.C. 154(b) by 738 days.

(21) Appl. No.: 10/345,803

(22) Filed: Jan. 16, 2003

(65) Prior Publication Data

US 2003/0140140 A1 Jul. 24, 2003

(30) Foreign Application Priority Data

Jan. 18, 2002 (EP) ................................ 02396004

(51) Int. Cl.
*G06F 15/173* (2006.01)

(52) U.S. Cl. ...................... 709/224; 709/225; 709/228; 709/229; 709/232; 726/4; 726/12; 726/23; 726/27

(58) Field of Classification Search ........ 709/223–225, 709/232, 228, 229; 726/1–13, 23, 27–29
See application file for complete search history.

(56) References Cited

U.S. PATENT DOCUMENTS

| | | | | |
|---|---|---|---|---|
| 5,875,296 | A * | 2/1999 | Shi et al. ........................ 726/5 |
| 5,963,915 | A * | 10/1999 | Kirsch .......................... 705/26 |
| 6,101,482 | A * | 8/2000 | DiAngelo et al. ............. 705/26 |
| 6,233,618 | B1 * | 5/2001 | Shannon ...................... 709/229 |
| 6,311,269 | B2 * | 10/2001 | Luckenbaugh et al. ...... 713/154 |
| 6,374,359 | B1 * | 4/2002 | Shrader et al. ................ 726/5 |
| 6,466,983 | B1 * | 10/2002 | Strazza ....................... 709/227 |
| 6,510,464 | B1 * | 1/2003 | Grantges et al. ............ 709/225 |
| 6,529,952 | B1 * | 3/2003 | Blumenau .................. 709/223 |
| 6,754,831 | B2 * | 6/2004 | Brownell ..................... 726/15 |
| 6,985,953 | B1 * | 1/2006 | Sandhu et al. .............. 709/229 |
| 6,996,841 | B2 * | 2/2006 | Kadyk et al. ................ 726/12 |
| 7,162,649 | B1 * | 1/2007 | Ide et al. .................... 709/223 |
| 2002/0065912 | A1 | 5/2002 | Catchpole et al. |
| 2002/0124187 | A1 * | 9/2002 | Lyle et al. .................. 713/201 |
| 2002/0133586 | A1 * | 9/2002 | Shanklin et al. ............ 709/224 |
| 2002/0143963 | A1 * | 10/2002 | Converse et al. ........... 709/229 |
| 2003/0061275 | A1 * | 3/2003 | Brown et al. ............... 709/203 |
| 2003/0074432 | A1 * | 4/2003 | Mazzitelli ................... 709/223 |

(Continued)

FOREIGN PATENT DOCUMENTS

EP 1 146 712 A 10/2001

(Continued)

*Primary Examiner*—Bunjob Jaroenchonwanit
*Assistant Examiner*—Duyen Doan
(74) *Attorney, Agent, or Firm*—Shalom Wertsberger; Saltamar Innovations (57) ABSTRACT

The invention relates to the monitoring of the flow of a data stream travelling between a client and a server system. The invention is intended particularly for such communications protocols carrying representation data above some connection-oriented protocol layer. The objective of the present invention is to bring about a flow monitoring mechanism enhancing system security. This is achieved by analyzing a data stream travelling from the server to the client in order to identify at least one response descriptor in the data stream. The identified response descriptors are stored in a set of available states for said client. Then the data stream travelling from the client to the server is analyzed in order to identify at least one request descriptor. The request descriptors identified are compared with the set of available states for said client, and in response to the comparing step, a monitoring result is generated.

19 Claims, 5 Drawing Sheets

U.S. PATENT DOCUMENTS

2003/0105976 A1* 6/2003 Copeland, III .............. 713/201

FOREIGN PATENT DOCUMENTS

| WO | WO 00/49528 | 8/2000 |
| WO | WO 00 49528 A | 8/2000 |
| WO | WO 01 44904 A | 6/2001 |
| WO | WO 01/44904 A2 | 6/2001 |
| WO | WO 02 01827 A | 1/2002 |

* cited by examiner

MONITORING THE FLOW OF A DATA STREAM

FIELD OF THE INVENTION

The invention relates to monitoring the flow of a data stream travelling between a client and a server system. The invention is intended particularly for communications protocols carrying representation data that are carried above some connection oriented protocol layer.

BACKGROUND OF THE INVENTION

Due to the recent continuing increase in Internet usage, the number of potential targets for attacks against computer systems by malicious users has exploded. In order to find possible security loopholes in the numerous systems attached to worldwide communications networks, the parties seeking to break into networked computers have developed a good arsenal of powerful tools, which can systematically find resources available for suspicious activities. Together with the skills of the intruders this has proven to be extremely harmful for network security, even though it has given birth to a rapid growth of network security industry battling against the unauthorized use and eavesdropping of networked computers.

Figure 1A:
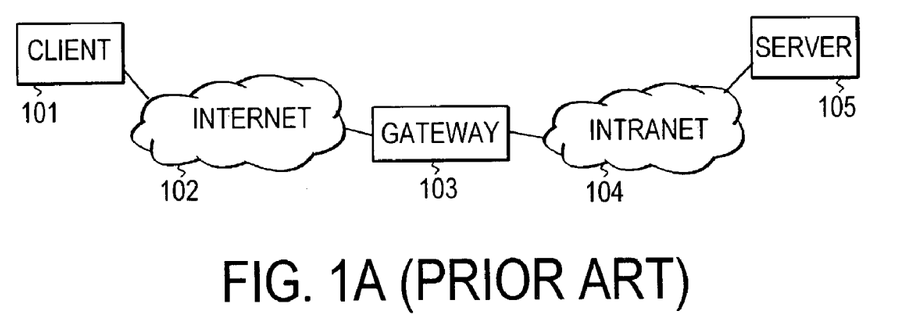
FIG. 1A shows simplified architecture of a typical network environment where HTTP proxies are commonly used.

A typical example of a network in which intrusions and other unsolicited attacks may take place is shown in FIG. 1A. The core network is in this case the Internet 102, to which the hacker denoted by client 101 is connected. On one side of the Internet is a gateway element 103 separating a private network 104, such as a corporate LAN or intranet, from the Internet. The hosts connected to the Intranet, such as server 105, are the potential targets of intrusions or attacks.

Especially many service platforms running on servers attached to the Internet have shown their vulnerability to malicious users. As an example, many e-commerce systems used in the World Wide Web (WWW) have been attacked. This has caused both financial damages and severe problems regarding the misuse of confidential user data, such as credit card numbers or other sensitive information.

If the service platform does not meet high security standards, it is probable that it can be misused to get control over the system, to gain some classified information or at least to cause the system to crash. As an example, it can be expected that fixed parameters in a query string coming from a client have the same values as in the original Hypertext Transport Protocol (HTTP) stream sent to the client by the server. If an attacker changes the parameter values in an unexpected way, the system may start behaving in an odd way. The same applies to the lengths of the parameters that the client returns.

Web servers may have so-called directory traversal bugs, which notoriously can be exploited to retrieve a file not intended for the public. An example of this is an HTTP request typed in the location window of a web browser, such as http://www.sitename.net/../../../etc/password. The server may return the password file of a UNIX system as a response, the file being readily available for future decryption purposes.

Other common targets of attacks have been different Common Gateway Interface (CGI) binaries and scripts processing Hypertext Markup Language (HTML) forms. CGI is the standard for the environment passed by a server to scripts used in the WWW. Many CGI scripts have bugs, which may be directory traversal bugs or other flaws, such as shell-related and buffer overflow bugs.

Measures developed for tackling and/or noticing the security vulnerabilities or exploits in servers are, for example, security scanners and network intrusion detection systems (NIDS). Using some security scanners available it is possible to perform a vulnerability analysis of the server, which can detect the vulnerable parts of a service. In the analysis the CGI scripts within the system are scanned for known vulnerabilities. A NIDS is a silent listener, which monitors traffic flowing in the network and generates an alarm when something suspicious is detected in the traffic. The NIDS looks for regular expressions, and the matching is usually done for Ethernet frames, IP packets, or for the TCP stream. Fingerprints of known harmful HTTP requests may be used in looking for suspicious parameter values. Typically, HTTP requests and responses are checked as corresponding pairs, because one TCP connection typically carries one HTTP request response pair. The problem with using fingerprints is that they are vulnerable to even slight modifications of the request pattern used. In addition, the method is computationally heavy, as multiple fingerprints are needed when analyzing every single request. This has an adverse effect on the overall performance of the system.

Figure 1B:
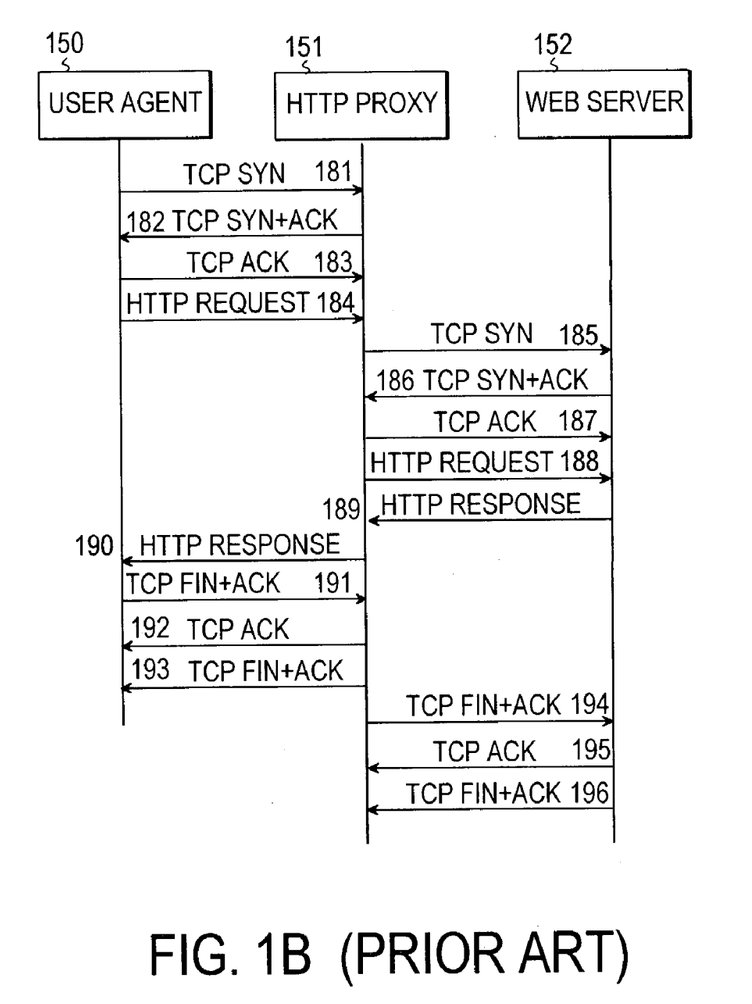
FIG. 1B illustrates the operation of a prior art HTTP proxy.

An HTTP proxy which can filter the request-response pairs is another security solution. Unfortunately, it has the same limitations as the other solutions discussed above. FIG. 1B shows a simplified example of the generic action of a prior art HTTP proxy-gateway 151. The user agent 150 wishing to send a request to the web server 152 sends a request to the proxy. The proxy may cache some information, such as static web pages, in order to reduce the load caused to the server by incoming requests. The user agent, such as a web browser, first sends a TCP SYN packet 181 to the proxy in order to establish a connection. If the proxy allows the connection, it answers by sending a TCP SYN+ACK packet 182 in response. The user agent receives this and answers with a TCP ACK packet 183, thus finalizing the TCP three-stage handshake procedure. The host ID may be checked from the IP frame on which the TCP packets are carried. Similarly, the client ID may be verified from the TCP headers; such information may include target and destination port and so on. The user agent is ready to send an HTTP request 184, for example, a request for a web page containing information in a presentation language such as HTML.

The proxy opens similarly a TCP connection to the web server by sending messages 185-187, providing that the response for the request is not cached in the proxy, as it is, for example, when the HTTP data, such as HTML content, has some dynamic parts, such as forms or scripts. The proxy then sends the HTTP request 188 to the web server. The request 188 may essentially be similar to the original request 184. The server responds to the request by sending an HTTP response 189 to the proxy. The proxy then forwards the response to the user agent as a new HTTP response 190. The user agent may close the TCP connection by sending the TCP FIN+ACK packet 191, for which the proxy answers by sending first a TCP ACK packet 192 and then a TCP FIN+ACK packet 193. The proxy then closes the connection to the web server by sending a TCP FIN+ACK packet 194. The web server answers by sending first a TCP ACK packet 195 and then a TCP FIN+ACK packet 196.

Fingerprinting does not suit well for detecting attacks against the dynamic pages used widely in modern information systems. It is also possible that the connection between the user agent and the HTTP proxy persists. This means that the user agent does not close the connection between the HTTP proxy and the user agent after receiving the HTTP response 190, but may send further requests to the proxy.

None of the prior art solutions described above is able to detect unforeseen attacks against CGI binaries utilizing forms or scripts, for example. The prior art solutions also perform poorly in guarding the server against user-induced buffer overflows of fields of static length, such as the hidden select/option fields used in many HTML forms. In, other words, the prior art solutions fail to protect a server against unsolicited attacks and misuse attempts, made either purposely or by mistake in cases when the misuse is performed on a legal system port using formally correct queries but utilizing the weaknesses of the system.

SUMMARY

The objective of the present invention is to bring about a flow monitoring mechanism enhancing system security.

The present invention relates to the monitoring of a data stream travelling from a client to a server. The data stream includes representation data carried on a connection-oriented carrier protocol. The representation data preferably utilizes some other protocol than the carrier protocol, and may be a stateless protocol. In the monitoring process, a data stream travelling from the server to the client is analyzed in order to identify at least one response descriptor in the data stream. Identified response descriptors are stored in a set of available states for the client. Next, a data stream travelling from the client to the server is analyzed in order to identify at least one request descriptor. Identified request descriptors are compared with the set of available states for said client, and responsive to the comparing step, a monitoring result is generated.

In accordance with one aspect of the present invention, the monitoring may further include performing a predetermined action at least partially based on the monitoring result.

In accordance with one aspect of the present invention, said predetermined action may include matching the data stream against known misuse patterns, if at least one request descriptor fails to match the stored response descriptors in the set of available states.

In accordance with one aspect of the present invention, said predetermined action may include allowing the data stream passage if the request descriptors match the stored response descriptors in the set of available states, and restricting the data stream if at least one request descriptor fails to match the stored response descriptors in the set of available states.

In accordance with one aspect of the present invention, said predetermined action may include generating an alarm event, which is selected at least partially based on the monitoring result.

In accordance with one aspect of the present invention, in the monitoring process a host identifier from the carrier protocol part of the first data stream between the client and the server may be stored, and then used in order to select the set of available states for said client. The host identifier is used for identifying available states for any client of said host.

In accordance with another aspect of the present invention, this may further be accomplished by storing a client identifier from the first data stream between the client and the server. The stored client identifier is then used to identify the set of available states for said client.

In accordance with another aspect of the present invention, the client identifier can be compared to the client identifiers stored in order to select the set of available states for said client. If the result of the comparison is that the client identifier does not correspond to the client identifiers stored, the set of available states for said client is selected from the set of available states for said host.

In accordance with one aspect of the present invention, in the monitoring process the analyzing of a data stream travelling from the server to the client includes analyzing different possible states of macro and/or form definitions included in the data stream in order to identify at least one response descriptor.

In accordance with another aspect of the present invention, the analyzing of different possible states may further include executing the macro file in the system in order to identify at least one response descriptor.

The present invention suits especially well for protecting or tightening systems utilizing protocols, such as the HTTP or the Wireless Application Protocol (WAP), carrying representation data, such as the HyperText Markup Language (HTML), Wireless Markup Language (WML), Extensible Markup Language (XML), or XML based representation languages, such as WSDL/SOAP (Web Services Description Language/Simple Object Access Protocol). The protocol carrying representation data may be a stateless protocol if the client can be identified in a straightforward manner, such as is the case when the TCP is used as a carrier protocol. When applied to these protocols, the available states, which are first detected from the data stream travelling from the server to the client, may correspond to the requests available. If the data stream is such that also more complex possibilities are available, some of the available states can be computed in advance and stored in a state table corresponding to the set of available states. Thus the analysis is performed on a response-request pair as opposed to the request-response analysis carried out in prior art. In addition, the invention teaches a method of using information obtained from a response transmitted within one TCP connection for the purpose of analyzing a request transmitted within another TCP connection, instead of the prior art analysis of a request-response pair of a single connection.

In order to facilitate the monitoring of the data flow, in one embodiment of the present invention the first query from the client to the server triggers the updating of a connection table. The connection identifier may further be detected to identify the session between the client and the server and thus enhance the efficiency of the system by faster correlation of the request-response pairs.

The present invention may be implemented in a NIDS or a proxy-firewall, for example. Thus, the invention provides new functionality to these prior art systems.

BRIEF DESCRIPTION OF THE DRAWINGS

The invention is described more closely with reference to the examples shown in FIGS. 2-6 of the accompanying drawings, in which.

DETAILED DESCRIPTION

In the following description, the invention is described in connection with an HTTP-proxy in order to better-illustrate the operation of the invention. This is not meant to be restrictive, however, as the invention may be employed in any other suitable network device as well. The present invention is described in more detail with reference to FIG. 2. A data stream coming from a client, i.e. from the user agent 150, is first received in a receiving block 202. The data stream may correspond to any traffic travelling in the Internet, but further on it is assumed that at least a part of it corresponds to some protocol used for carrying representation data, and which may be in a stateless protocol format, such as HTTP. The receiving block in this example may be located in a proxy. The data stream may consist of packets, which may be collected to form a complete request in the receiving block. When the receiving block receives TCP/IP packets, it can extract destination and host information, such as the network addresses and ports, from the header parts of the packets. Generally the HTTP is carried above the TCP layer, and requests or responses no longer contain this information.

Figure 2:
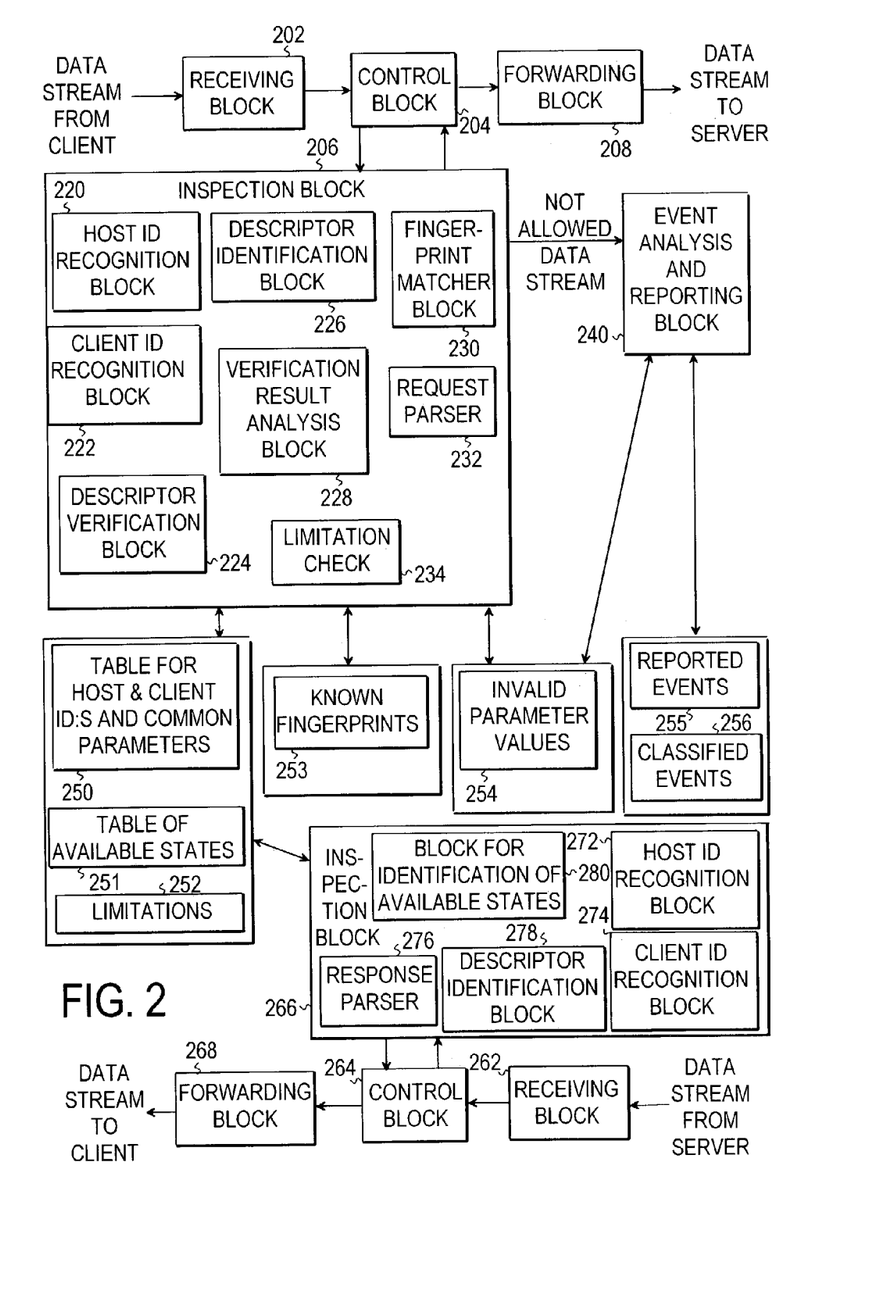
FIG. 2 is an exemplary functional block diagram showing how the present invention applied to a data stream moderator works.

The receiving block 202 forwards the data stream received, together with the host information, to the control block 204. The control block performs buffering of the received data, but more importantly, if the data is intended for some HTTP port in the server 152, it forwards the data to an inspection block 206 together with the host information. The control block also receives validated data from the inspection block to be fed to a forwarding block 208. The forwarding block forwards the data stream to the server in a manner described above.

The inspection block has a host ID recognition block 220, which together with a client recognition block 222 can check whether the client has communicated with the server before. The host recognition block checks if it can identify the originating host on the basis of the host information. The client recognition block checks if it can identify any client identifier in the data stream. Such client identifiers include identification cookies or other information, which have been preconfigured by a system administrator. If such preconfigured information does not exist, other identification information, such as the HTTP User Agent header value, can be used. The client identifier may be used to identify the client. Further, the client identification block may include a part for recognizing other common parameters. Common parameters are parameters which are common to all connections/requests originating from one client. Such common parameters may be, for example, the HTTP Host header value, i.e. the name of the target server, and then some further cookie references.

The host and client information are stored in a table 250 together with the common parameters detected. The request parser 232 parses the request, and may operate as described in more detail below. The limitation check block 234 verifies that the parsed parameters in the request are within the defined limitations, which are read from the limitations table 252. The corresponding recognition blocks 220 and 222 check if the information exists in the table 250. If the corresponding entry is not found, they forward the data stream to a fingerprint matcher block 230, which checks whether the HTTP data stream contains parts resembling known attack patterns, i.e. known fingerprints 253. If the fingerprint result is negative, i.e. no attack is detected, a new entry is made in the table 250. In this way it can be at least partly verified that a new client is not attempting an attack. In the opposite case, the data stream may be stored in memory in a table 254 containing invalid parameter values, and then forwarded to an event analysis and reporting block 240. As may be noted, the parsing and limitation checking steps may be performed either before or after the operations performed in steps 220 and 222, because it is desirable to parse all requests in order to inspect them in more detail. The limitations table 252 may, for example, contain allowed parameter value ranges for different CGI binaries. These limitations may depend on each CGI binary file, so the limitations described in the limitations table 252 may be separately defined for each CGI binary and each script.

The descriptors defining the content of the request are identified in the descriptor identification block 226 from the parsed request. The identification of descriptors is discussed below in more detail with reference to FIG. 5. The descriptor verification block 224 reads the available states for said client from a table of available states 251, which contains descriptors, i.e. what kind of legitimate/valid requests may be coming from the client. The descriptor verification block further compares the descriptors in the request to the descriptors in the table of available states. Basically the table of available states is created for each client separately, but it could as well be a host-based table, in which the available states for different clients from the same host are collected. Either the request parser, the descriptor identification block, or the descriptor verification block can have the functionality of mapping at least some part of the request into a more generic format, i.e. expressions with syntax such as % 20 can be replaced with a space, and so forth.

It will be noticed in the verification result analysis block 228 whether any invalid parameter values or descriptors are detected. The verification result analysis block may have a rule base, on the basis of which the verification result analysis block can classify failures to meet the available states and/or common limitations. At least the cases for which the failure is classified as serious or hazardous are forwarded to the event analysis and reporting block 240, instead of the data stream being passed to the forwarding block 208 to be forwarded to the server 152.

The event analysis and reporting block may read the invalid parameter values file 254, which may also contain a classification made by the verification result analysis block 228, according to a rule base if it has been defined. The event analysis and reporting block may get the data stream as a whole as well, with information from the host and client identifiers too. The events are further classified and stored in the classified events file 256, and the events serious enough to be reported are recorded in the reported events file 255, which may include means for visually or audibly outputting an event occurrence code for administrative purposes. The event analysis and reporting block may further record all communications permanently as evidence.

The data stream travelling from the server 152 to the user agent 150 is analyzed as well. For this purpose, it is possible to use an inspecting block 266. It is evident that the functionalities of the inspecting block 266 may be incorporated in the inspection block 206, which in this way could take care of inspecting traffic travelling in both directions. The solution described utilizing different inspection blocks for the different directions better lends itself for load sharing purposes. In this way it is easy to distribute the tasks of the different inspection blocks to different processors or computers.

The receiving block 262 receives the data stream coming from the server. It forwards it to the control block 264, which operates in much the same way as the control block 204 does. The main difference is that now the different parts of the TCP and IP headers are used, as it is the destination port and address which define the host running the user agent application to which the traffic is travelling, instead of the source information used for the traffic going in the opposite direction.

The control block forwards the content HTTP stream to the inspection block 266. First the host ID is recognized from the data stream in the corresponding host ID recognition block 272. Then the client ID is identified in the client ID recognition block 274. If the response is representation data, the response is parsed in the response parser 276. The available states and limitations offered by the response are identified in the descriptor identification block 278. If the response includes scripts or forms, the descriptor identification block may further inspect them in order to find possible limitations and illegal parameter combinations. If something is found, the data can be stored in the limitations table 252. If the response includes scripts, for example, it may be necessary to execute them before analysing the response.

The available states identification block 280 reads the table of available states for the client 251. The correct table is selected on the basis of the host and client IDs, which can link the identities to the available states table in the table for host and client IDs and common parameters 250. The available states identification block then compares descriptors received from the descriptor identification block with the stored available states 251 and removes duplicates from the available states detected. Then it stores the new available states into the table of available states. The forwarding block 268 receives from the control block 264 the data stream containing also the response data and sends it to the client.

The functional block diagram of FIG. 2 suits for a NIDS as well. The main difference in that case is that the forwarding and control blocks are not needed, as a NIDS is a silent listener and only monitors network traffic.

Figure 3:
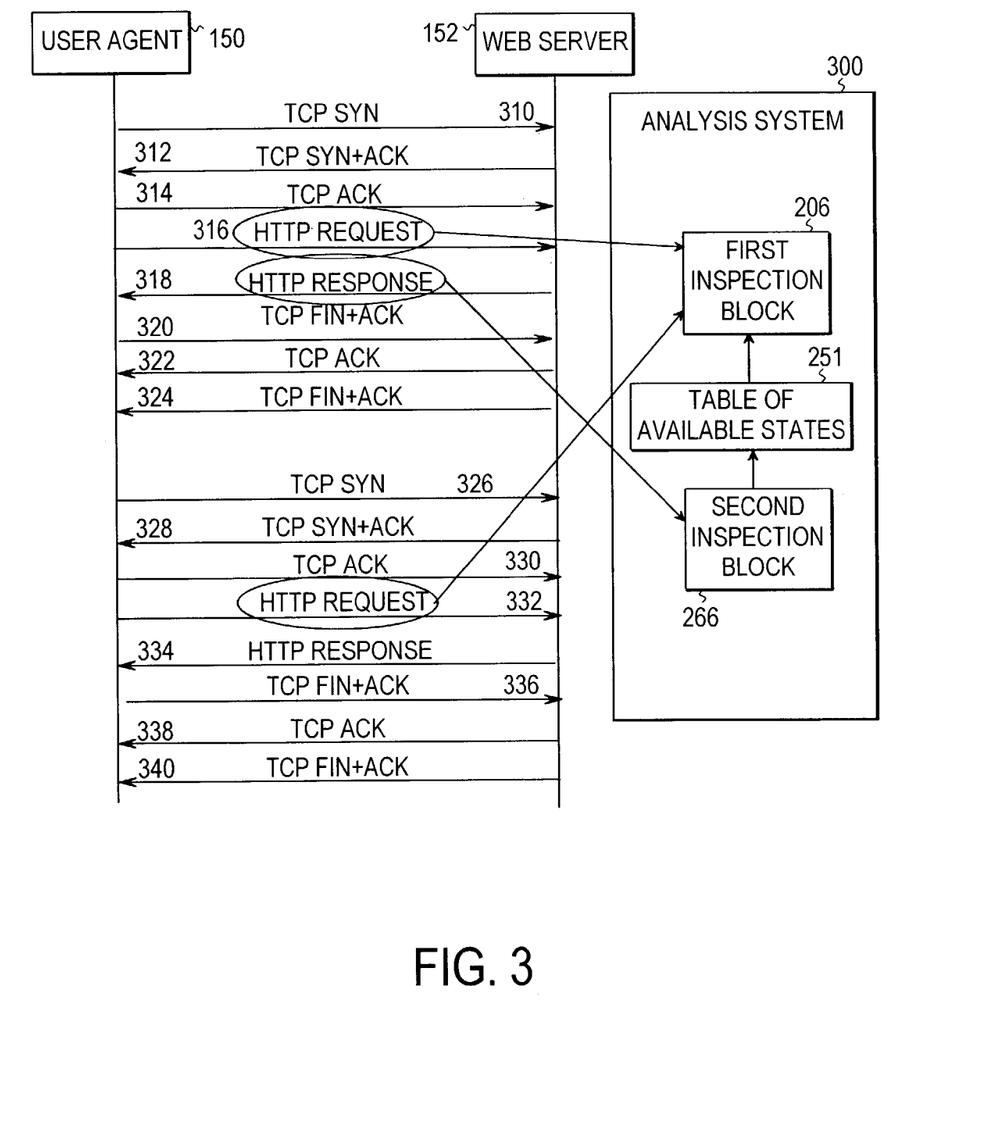
FIG. 3 shows how an aspect of the present invention is realized in FIG. 2 works for HTTP traffic.

FIG. 3 illustrates data flow between the user agent 150 and the web server 152, discussed below in more detail. The user agent sends a TCP SYN packet 310 to the web server in order to establish a connection. The server responds by sending a TCP SYN+ACK packet 312 in return. The web server receives the packet 312 and answers by sending a TCP ACK packet 314, after which the TCP connection is fully established.

The open connection may be used by the client, for example, for sending an HTTP request 316 to the web server. The web server analyzes the request and responds with an HTTP response 318. If the HTTP connection is non-persistent, the client closes the underlying TCP connection by sending a TCP FIN+ACK packet 320, for which the web server responds by sending first a TCP ACK packet 322 and then a TCP FIN+ACK packet 324.

To send a new HTTP request the client has to open a new TCP connection. This is done similarly by sending a TCP SYN packet 326, receiving a TCP SYN+ACK packet 328, and further by sending a TCP ACK packet 330 before the new HTTP request 332 may be sent. After receiving the response 334, the client closes again the TCP connection by sending a TCP FIN+ACK packet 336, which is confirmed by the server responding with a TCP ACK 338 and TCP FIN+ACK 340.

If an HTTP proxy 151 is used between the client and the server, the messaging corresponds to the process already discussed with reference to FIG. 1B. To implement the present invention for monitoring the traffic between a server and a client, however, it is not necessary to use a web proxy. The traffic is analyzed by the analysis system which may be located in a proxy or in some other network element. The element may be a part of a network intrusion detection system as well.

If a proxy system is used, the analysis of the response-request pairs according to the present invention would be carried out for the request 184 and response 190, and so on for further communications as well, or alternatively for the traffic between the proxy and the web server. In the latter case the request-response pairs have to be identified in a different way, because the originator of the packet received by the web server may indeed be the proxy and not the user agent. Hence, the host information cannot be used for identifying a host, but the invention is implementable with a proxy system as well, since the client identifiers are still usable. Moreover, if identification cookies or some other identifying mechanisms are used, different clients can be identified without the host ID. In general, information contained in the request 316 is passed to the analysis system 300. The first inspection block 206 checks the host and client identifiers and possible common parameters, and stores them in the corresponding table 250. It may also perform a limitation check and a fingerprinting procedure in order to find malicious requests, classify and report events, etc., as described above with reference to FIG. 2. The first inspection block 206 analyzes the request in its descriptor identification block 226. If the request is the first one, it can only be checked against fingerprints and the limitations table 252.

The response 318 is analyzed as well. The second inspection block 266 performs tasks similar to the first inspection block 206 in the sense that it analyzes the HTML part of the stream and tries to identify possible descriptors and limitations. The descriptors identified are stored in the table of available states 251. Similarly, the limitations identified are stored in the limitations table 252.

When the analysis system receives the next HTTP request coming from the same host, the request is also analyzed in the first inspection block 206. Because the first response destined for the client has already been received, the inspection block now has more information, since the second inspection block 266 has already stored some state information in the table of available states 251. This information may be used to verify the descriptors identified in the request 332. In this sense one could understand the process as validation of the requests, but this might be a bit misleading in that if a network intrusion detection system is in use, the traffic does not need to be validated but only suspicious activities need to be identified.

The system continues the operation in a similar way. In other words, the future requests are analyzed against all historical knowledge about descriptors identified in the responses during the connection.

Figure 4:
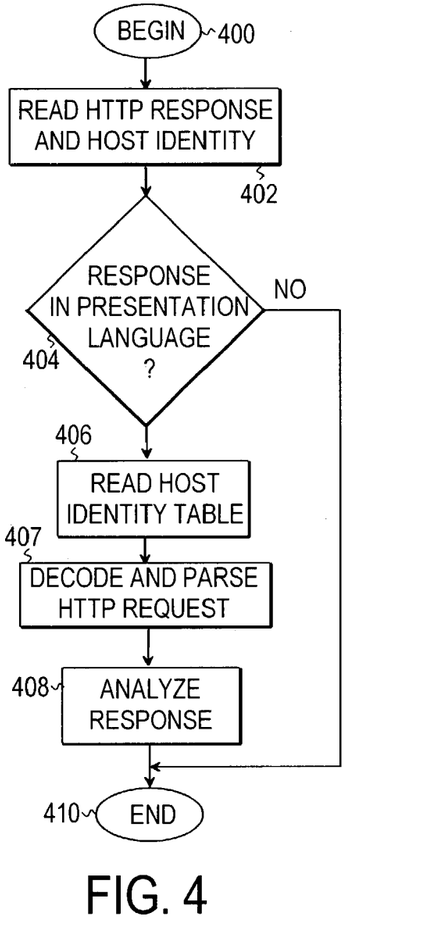
FIG. 4 illustrates how the data stream moderator in FIG. 2 operates when detecting a data stream of a response travelling from the server to the client.

FIG. 4 shows the analysis task of the inspection block 266, which is used for inspecting responses sent from the server to the user agent. When the inspection block receives the traffic (step 400), the data containing the HTTP response and host identity is read in step 402. Basically, blocks 272, 274, 276, and 278 may be involved in different parts of this process. The inspection block verifies (step 404) that the response is in a presentation language, such as the HTML. The HTTP responses may also include data in binary format, such as images, sound, or other multimedia information. These parts of the responses do not necessarily need to be analyzed. If the response consists wholly of such data, the process is terminated (step 410). Otherwise, at least the host identity part of table 250 is read (step 406) in order to retrieve the available states information correctly, but this step may also include reading the client identity table and other common parameters.

After this the request is decoded and parsed in step 407. The parsing is described in more detail with reference to FIG. 5. The analysis step 408 analyzes the parsed response in more detail, after which the processing of the response is terminated (step 410) in the inspection block 266.

Figure 5:
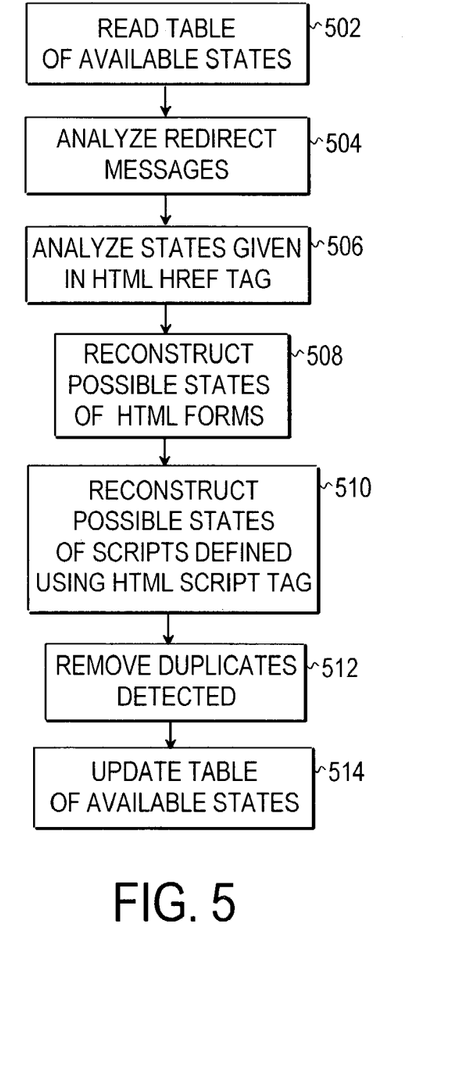
FIG. 5 illustrates the function of the ANALYZE RESPONSE-block as shown in FIG. 3 in more detail when applied to an HTTP stream.

FIG. 5 illustrates how the response is analyzed in step 408. First the table of available states is read in step 502. From table 251, the entries corresponding to the available states are selected on the basis of the client identity. Alternatively, this can be implemented so that there is a separate table reserved for each client or host identity.

After step 502, the content of the response is examined. In other words, possible descriptors corresponding to the available states are identified from the response in order to later examine the requests. In step 504 possible HTTP REDIRECT messages are identified, and then the parameters of these messages are added as descriptors to the set of available states under examination. For example, a redirect message might inform that an URL (Universal Resource Location) http://www.stonesoft.com/services/ is indeed located at http://www.stonesoft.com/customer/services/.

In step 506 the states given in the possible HTML HREF tags are identified. These correspond to hyperlinks and are commonly identified in a stream like <a href="/contact.html">Contact</a> where the HREF part identified has been emphasized with a bold font. If HREF identifiers are found, they are added as descriptors into the set of available states under examination. That is, if the following request from the client is a GET request for /contact.html, the request is included in the available states and the request is therefore legal.

In step 508 analysis of possible forms in the response is performed. An example follows of a form part in the response, the form part being notified by the FORM tags, denoted with a bold font:
<HTML>
<form action="/sites/search.exe" method="GET">
<input type=hidden name=profile value="user">
<input type=text name=query size=50 maxlength=800>
<SELECT NAME=language>
  <OPTION VALUE=XX>any language
  <OPTION VALUE=en>English
  <OPTION VALUE=zh>Chinese
  <OPTION VALUE=fi>Finnish
  <OPTION VALUE=fr>French
  <OPTION VALUE=de>German
  <OPTION VALUE=sv>Swedish
</SELECT>
<input type=submit name=search value="Search">
</form>
</HTML>

Here the available options, parameter length limitations, and other relevant information are stored as descriptors in the set of available states and limitations under examination. The available states for the resource /sites/search.exe for the client in question obtained from the above response are:
method=GET,
profile=user,
language=XX, en, zh, fi, fr, de or sv, and
search=Search.

That is, the future requests from the client in question need to conform to these available states. The limitations for the resource /sites/search.exe, which concerns all hosts and clients obtained form the above response are: 1) the length of the query parameter value is less than or equals to 800, and 2) the length of the language parameter value equals to 2.

That is, all legal requests from any client to the site in question need to conform to these limitations.

If the response consists of scripts, they are analyzed in step 510. This is a more complicated task, because it is possible that the script action cannot be deduced merely by analyzing the contents of the script data. Hence, it may be necessary to execute the script in order to find out what kind of responses it is able to generate so that the corresponding response descriptors can be identified. The script is analyzed in a processor, which may be the one the inspection block 266 utilizes, or the script analysis may be performed in a separate analysis processor. The results of the analysis, which correspond to the descriptors identified, are stored in the set of available states under examination as well.

After the available descriptors in the response have been analyzed, they are compared with the available states read from table 251 in step 502. If there are any descriptors that are not already contained in table 251 for said user agent, they are updated in the table (step 514). In order to do this efficiently, possible duplicates (i.e. states already identified and stored in the table) must be detected so that only the new available states are stored (step 512).

Figure 6:
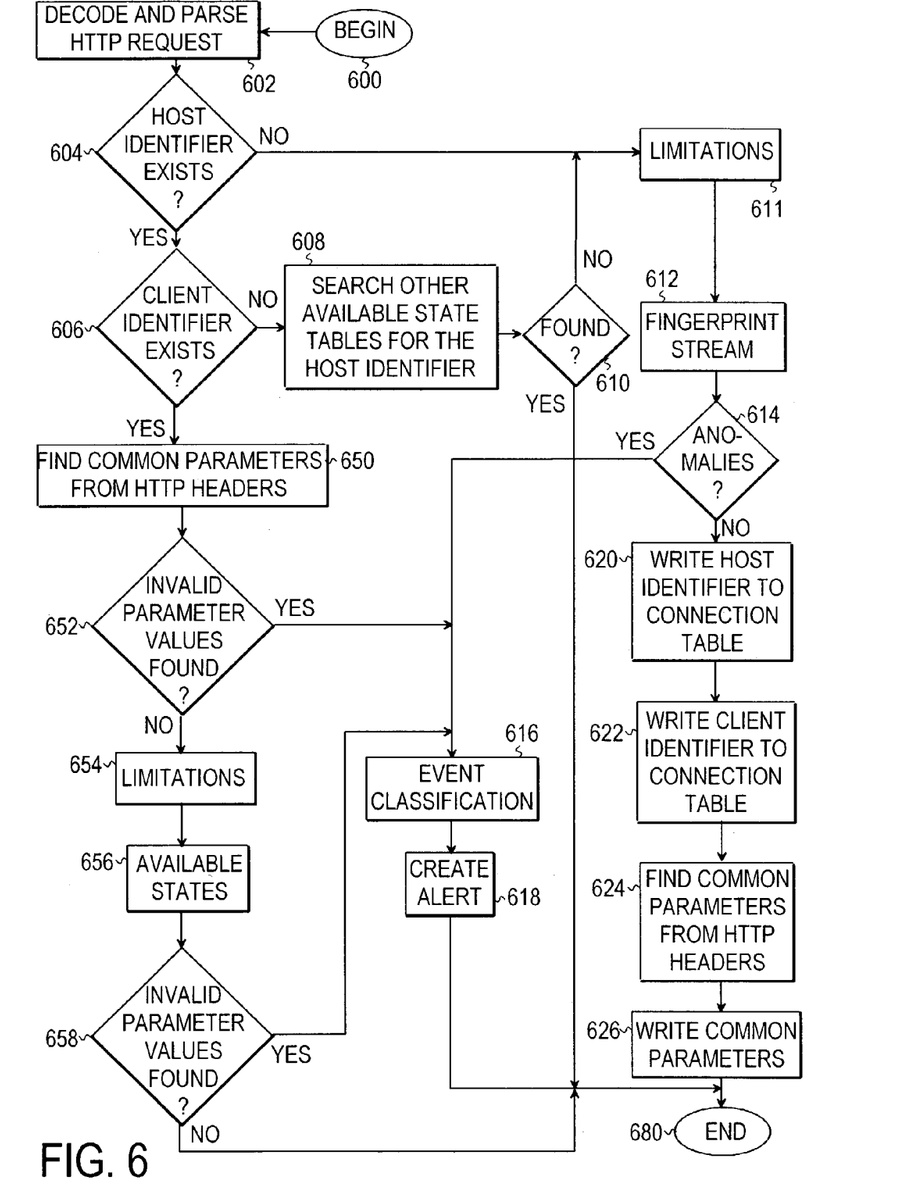
FIG. 6 shows how the data stream moderator in FIG. 2 can operate when the present invention is applied to an HTTP stream.

FIG. 6 represents the handling of an HTTP request such as requests 316, 332, or any subsequent request in the first inspection block 206. First, the inspection block receives the data stream in step 600. This stream may include some compressed or encoded parts, so they must first be decompressed and decoded. After this the request is ready to be parsed. These steps are performed in the decode and parse HTTP request step 602 in the request parser block 232.

After this stage the first inspection block has to read the host identifier. This information may be obtained, as described above, from the IP and TCP headers, and it is possible that the inspection block simply receives this data from the control block 204 readily extracted. If the host identifier received already exists in table 250, as is checked in step 604, the communication between the user agent 150 and the web server 152 corresponds to request 332 or to any subsequent request for which responses like 318 have already been received. In the opposite case, which will be discussed first, the request corresponds to the first request 316 from the user agent or host. The analysis is therefore branched in step 604 or 606.

If the host identifier is not found, the request descriptors from the parsed request are checked (step 611) on the basis of the limitations table 250. This may include, for example, parameter limitations related to server's IP address, host name, and abs_path part of the URI (Universal Resource Indicator) excluding the query part of the request. Then the request stream itself is compared (step 612) against fingerprints from known misuse attempts. This step employs normal pattern recognition methods, such as comparing the stream to some previously stored strings corresponding to parts of the requests. The comparison may be performed in the fingerprint matcher block 230.

Step 614 evaluates the results of the two previous analysis steps 611 and 612. If the result of the comparison is that the known misuse patterns are detected or if in step 611 it was noticed that descriptors defining illegal parameter values etc. were encountered, the event may be classified in the event classification step 616. This verification and classification may be done in the event analysis and reporting block 240. Then, if desired, an alert is generated in step 618, and the request is blocked, i.e. it is not forwarded to the web server. This last step may take place in the proxy or in the HTTP shield program in the server, but probably not in any network intrusion detection system. The NIDS generates an alert instead, which helps the system administrator to identify possible problems.

In the opposite case, i.e. when no known misuse patterns are detected, the host identifier is updated in the connection table 250 in step 620. Similarly, the client identifier may be updated (step 622) in the table. If any common parameters are found in the request, they are identified in step 624 and further updated in table 250 in step 626.

After these actions the handling of the first request has been performed (step 680), and the request is ready to be forwarded to the web server.

If in step 604 it is detected that the host identifier already exists in table 250, a client identifier of the request is processed. In step 606 it is verified whether the client identifier already exists in table 250. Table 250 is thus used to detect whether the user agent has already been in communication with the server. This can be detected, as explained above with reference to FIG. 3, because the TCP connection can be terminated after each request-response pair, as opposed to the case of persistent HTTP connections, for which the TCP connection remains between subsequent requests. Hence, table 250 can map the response/request descriptors for the user agent identities to span over the communications history, which includes many different connections. This principle is used when implementing the invention, i.e. response-request pairs are mapped to bridge over subsequent TCP connections.

If the client identifier is not found, then in step 608 the descriptor verification block 224 checks whether the request descriptor can be found in any of the available state tables 251 related to the host identifier. If no matches are found, which will be ascertained in step 610, the request will be handled as a new request, thus forwarding it to limitation check step 611, which takes place in block 234. Next, the request is forwarded to the fingerprint matcher block 230, which performs the fingerprinting step 612. The rest of the steps are also performed as for a new request. If a descriptor corresponding to another client identifier from the same host is found, the client identifier from the request is mapped to the found client identifier for future processing and the process is terminated in step 680. This corresponds, for example, to a case in which the user has simply changed the web browser from Microsoft Internet Explorer to Netscape and copied the URL from the previous browser screen onto the Netscape location field.

If the host and client identifiers are found, the processing is continued in step 650. In this step the common parameters are identified from the HTTP headers. In step 652 they are compared to the values retrieved from table 250, and if there are any anomalies, such as invalid parameter values detected, the next step 616 is to continue with an event classification procedure as already explained. This may correspond, for example, to a situation in which someone is typing the HTTP requests directly using Telnet. In general, this may be considered suspicious. Alternatively (not shown in figure), fingerprint analysis as explained above may be done for the request and the request allowed if no anomalies are found.

In the opposite case, the possible limitations, such as for the scripts, are retrieved from the limitations table 252 in step 654, and the descriptors identified in the previous responses are read from the table of available states 250 in step 656. The parsed descriptors in the request are then further compared with the retrieved limitations and descriptors in the step 658. If the descriptors match those in the set of available states as combined from the limitations and the descriptors, the request appears to be valid, and the process may be ended (step 680). In the case of a web proxy, the request may be passed to the web server, and in the case of a NIDS no operation is needed.

In the opposite case, i.e. if at least one of the parameters is not valid, it is possible that this corresponds to an event. For this reason the possible event is checked in the event classification step 616. Further, if there is an event which corresponds to something alarming, such as a hacking attempt, an alarm may be generated (step 618). After this, the processing is ended (step 680). It is possible that in the event classification step it is detected that the modifications in the descriptors are not harmful. In this case it is possible to allow the forwarding of the request if the invention is implemented in a proxy element.

Figure 7:
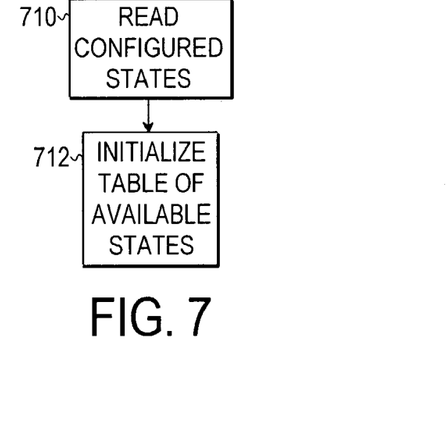
FIG. 7 depicts how the set of available states in FIG. 2 may be initialized for a new client.

FIG. 7 shows how the table of available states is initialized when a new client and/or host is observed for the first time. The procedure described here is additional, and it may be skipped as well, but it enhances the system performance and reduces extra processing of future requests. After step 626 and before the request is forwarded, the system may read the configured states in the memory (step 710). These configured states may include some known limitations for the services or states which are known to cause false alarms if not specifically allowed etc., which are static in their nature and common for most clients. These descriptors are then copied in the initialized states table 251 in step 712. An alternative for this is, of course, that the descriptors defining the configured states are stored in a file accessible for the inspection block 206, so that this file is read when processing requests from all clients. The latter solution complicates the system a bit, but possible changes in the configuration may be put in effect more quickly.

One further embodiment of the present invention concerns how the computer system is implemented. For load balancing purposes and scalability, one processor or one server system may not seem sufficient when high network loads are expected. For this reason, the system may be implemented in a computer cluster, in a manner such as is described below.

The system may comprise a plurality of processing units for identifying the request and/or response descriptors, and the analysis is taken care of in one processing unit. The processing unit for parsing the request, may be selected according to some predefined criteria. These predefined criteria can be, for example, the IP addresses in data packets carrying the requests and responses, the host identifier, the web service used, the current load in one processing unit, and so on. The parsed requests and/or responses from a plurality of processing units are sent to a processing unit handling the analysis. Comparison of the request descriptors with the table of available states of the client is thus performed in the same processing unit.

If the system capacity is further enhanced, more processing units can be designated for the comparing step as well, but this is not as straightforward as using multiple parsing blocks, since all requests and responses of one host need to be processed in the same comparing block in order to have all required information for the analysis. The processing unit with which the request is analyzed may be selected according to some predefined criteria. These predefined criteria can be the host identifier, the web service used, the current load in one processing unit, and so on.

The order in which the processing steps (FIGS. 4-7) are performed is merely illustrative and is intended in no way as restrictive in the implementation of the invention. Due to the nature of the invention, only one possibility has been shown, but an educated reader skilled in the art may end up having a similar effect by slightly changing the processing order.

Even though the present invention has been explained above using a proxy system as an example, it is to be understood that a network proxy is not the only network element in which the invention could be implemented as such. For example, a network intrusion detection system (NIDS) may include elements similar to the inspection blocks 206 and 266, together with the relevant data files, as well as the event analysis and reporting block 240. The NIDS monitors network traffic and tries to detect possible intrusions. It knows the status of connections, and if it is listening to the network traffic, it may detect a data stream which is not allowed. As this may be a precursor sign of an approaching intrusion, it may be immediately reported, but usually the NIDS starts to follow the connection in question in more detail.

A stateful firewall capable of performing the filtering operations described above is also a suitable location for implementing the present invention. Equally, the invention may be used in a server, such as an HTTP server, for verifying that the requests the server is handling are legitimate. Especially in this latter case it is convenient to use cookies for identifying different clients, since the exact way in which the server is using the information included in cookies can be taken advantage of.

The invention applies equally well to systems other than TCP/IP networks in connection with data streams utilizing HTTP. As one example, WAP (Wireless Application Protocol) carrying presentation language content such as WML, is an applicable target for implementing the invention as well when the traffic is run over normal circuit-switched or packet-switched data, such as GPRS. As another example, systems utilizing XML or some other presentation language apply as well, hereby increasing the scope of the invention. Therefore, while there have been described what are at present considered to be the preferred embodiments of this invention, it will be clear to those skilled in the art that various other embodiments, changes, and modifications may be made therein without departing from the spirit or scope of this invention and that these specifications, are therefore aimed to cover all such changes and modifications as fall within the true spirit and scope of the invention, for which letters patent is applied.

The invention claimed is:

1. A method for monitoring the flow of a data stream between a client and a server, wherein the data stream is a connection-oriented carrier protocol, comprising the steps of:
    analyzing a first data stream traveling from the server to the client in order to identify at least one response descriptor therein, said response descriptor defining a content of an expected request from the client;
    updating a client-specific set of allowance states associated with said client by storing the identified response descriptors or a descriptor of said expected request in set;
    forwarding said first data stream to the client associated therewith;
    subsequently, analyzing a second data stream traveling from the client to the server in order to identify at least one request descriptor therein;
    comparing said request descriptors with said client-specific set of allowable states;
    generating a monitoring result responsive to said step of comparing wherein said steps of analyzing the first data stream, updating a client-specific set of allowable states associated with said client, comparing said request descriptors with said client-specific set allowable states, and analyzing the second data stream, are performed at a network node different than said client and said server, and coupled to a communication path between said server and said client; wherein a step of performing a predetermined action at least partially based on the monitoring result; wherein said action comprises allowing the second data stream passage if the request descriptors match the stored response descriptors in the set, and restricting the data stream if at least one request descriptor fails to match the stored response descriptors in the set.

2. A method according to claim 1, wherein said action comprises matching the second data stream against known misuse patterns, if at least one request descriptor fails to match the stored response descriptors in the set.

3. A method according to claim 1, wherein said action comprises generating an alarm event, which is selected at least partially on the basis of the monitoring result.

4. A method according to claim 1, further comprising the steps of:
    storing a host identifier from a carrier protocol part of the first data stream; and
    using said stored host identifier to select a set associated with said client.

5. A method according to claim 1, further comprising the steps of:
    storing a client identifier from the first data stream and using said stored client identifier to select a set associated with said client.

6. A method according to claim 1, further comprising the steps of:
    storing a host identifier from a carrier protocol part of the first data stream;
    storing a client identifier from the first data stream,
    comparing a client identifier from the second data stream to the stored client identifiers in order to select a set associated with said client; and,
    if the client identifier of the second data stream does not correspond to the stored client identifiers, comparing a host identifier from the second data stream to the stored host identifiers, in order to select a set associated with said client.

7. A method according to claim 1, wherein the analyzing step of said first data stream comprises analyzing different possible states of macro definition, or form definition, or a combination thereof, included in said first data stream for identifying at least one response descriptor therein, or deriving at least one response descriptor therefrom.

8. A method according to claim 7, wherein the analyzing step of different possible states comprises executing a macro in order to identify at least one response descriptor therein, or deriving at least one response descriptor therefrom.

9. A method according to claim 1, wherein the connection-oriented carrier protocol is Hyper Text Transfer Protocol (HTTP), Wireless Application Protocol (WAP) or Simple Object Access Protocol (SOAP).

10. A method according to claim 1, wherein connection oriented carrier protocol carries representation data in HyperText Markup Language (HTML), Wireless Markup Language (WML), Extensible Markup Language (XML), or Web Services Description Language (WSDL) format, or a combination thereof.

11. A network node for monitoring the flow of a data stream traveling from a client to a sever, wherein the data stream is a connection-oriented carrier protocol, and wherein said network node is different than said client and said server, and coupled to a communication path between said server and said client, the system comprising:
   a first analyzer constructed to analyze a first data stream traveling from the server to the client in order to identify at least one response descriptor therein, said response descriptor defining a content of an expected request from the client, the analyzer further constructed to subsequently analyze a second data stream traveling from the client to the server in order to identify at least one request descriptor therein,
   a storage coupled to said analyzer, and adapted to store response descriptors or expected requests identified by said analyzer, in a client specific set of allowable states associated with said client,
   a comparator for comparing an identified request descriptors with said client specific set; and
   a monitor coupled to the comparator, the monitor constructed to generate a monitoring result;
   an execution block for performing a predetermined action at least partially based on the monitoring result; wherein said execution block is further constructed to allow the second data stream passage, if the request descriptors match the stored response descriptors in the set, and a module adapted to restrict the second data stream, if at least one request descriptor fails to match the stored response descriptors in the set.

12. A network node according to claim 11, wherein said execution block comprises a module adapted to compare the second data stream with known misuse patterns, if at least one request descriptor fails to match the stored response descriptors in the set.

13. A method according to claim 11, wherein said execution block is further constructed to generate an alarm event, including a module to select the event at least partially based on the monitoring result.

14. A network node according to claim 11, wherein said storage being further constructed to store a host identifier from the carrier protocol part of the first data stream between the client and the server, the network node further comprising a selector constructed to use said stored host identifier to select the set associated with said client.

15. A network node according to claim 11, wherein said storage being further constructed to store a client identifier from the first data stream between the client and the server, wherein the network node further comprising a selector constructed to use said stored client identifier to identify the set for said client.

16. A network node according to claim 11, wherein said storage being further constructed to store a client identifier and a host identifier from the first data stream between the client and the server, the network node further comprises:
   a first comparator, constructed to compare a client identifier of a second data stream to the client identifiers stored in said storage in order to select a set associated with said client; and
   a second comparator, constructed to compare a host identifier of the second data stream to the host identifiers stored in said storage in order to select a set associated with said client, if the client identifier of the second data stream does not correspond to the client identifiers stored.

17. A network node according to claim 11, wherein said analyzer is further constructed to analyze different possible states of a macro definition or a form definition, or a combination thereof, included in said first data stream for identifying at least one response descriptor therein, or deriving at least one response descriptor therefrom.

18. A network node according to claim 17, wherein said analyzer is further constructed to execute a macro file in order to identify at least one response descriptor therein, or derive at least one response descriptor therefrom.

19. A computer program product stored on a computer readable storage medium, the product being adapted, when executed on a computer, to perform monitoring of the flow of a data stream between a client and a server, wherein the data stream is a connection-oriented carrier protocol, and wherein said computer is different than said client and said server, and coupled to a communication path between said server and said client, said monitoring comprising the steps of:
   analyzing a first data stream traveling from the server to the client in order to identify at least one response descriptor therein, said response descriptor defining a content of an expected request from the client,
   responsive to the analyzing step, updating a client-specific set of allowable states associated with said client by storing response descriptors identified into a set
   forwarding said first data stream to the client associated therewith;
   subsequently, analyzing a second data stream traveling from the client to the server in order to identify at least one request descriptor therein,
   comparing said request descriptors with said set, and
   generating a monitoring result responsive to said step of comparing,
   wherein a step of performing a predetermined action at least partially based on the monitoring result; wherein said action comprises allowing the second data stream passage if the request descriptors match the stored response descriptors in the set, and restricting the data stream if at least one request descriptor fails to match the stored response descriptors in the set.

* * * * *